(12) United States Patent
Higgins et al.

(10) Patent No.: US 10,576,994 B1
(45) Date of Patent: Mar. 3, 2020

(54) AUTONOMOUS SYSTEM OPERATOR COGNITIVE STATE DETECTION AND ALERTING

(71) Applicant: NIO USA, Inc., San Jose, CA (US)

(72) Inventors: James S. Higgins, San Jose, CA (US); Abhishek Singhal, Santa Clara, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/108,327

(22) Filed: Aug. 22, 2018

(51) Int. Cl.
| | |
|---|---|
| *B60W 50/14* | (2012.01) |
| *B60W 40/08* | (2012.01) |
| *G05D 1/00* | (2006.01) |
| *G06K 9/00* | (2006.01) |

(52) U.S. Cl.
CPC ............ *B60W 50/14* (2013.01); *B60W 40/08* (2013.01); *G05D 1/0061* (2013.01); *G05D 1/0088* (2013.01); *G06K 9/00845* (2013.01); *B60W 2040/0818* (2013.01); *B60W 2050/143* (2013.01); *B60W 2050/146* (2013.01); *G05D 2201/0213* (2013.01)

(58) Field of Classification Search
CPC .... B60W 50/14; B60W 40/08; G05D 1/0061; G05D 1/0088; G06K 9/00845; B60Q 9/00
USPC ..... 340/425.5, 575, 576; 455/426.1; 702/19, 702/94
See application file for complete search history.

(56) References Cited

U.S. PATENT DOCUMENTS

| | | | |
|---|---|---|---|
| 8,781,568 B2 | 7/2014 | Dugan et al. | |
| 9,725,036 B1 | 8/2017 | Tarte | |
| 9,925,872 B1* | 3/2018 | Alasry | B60W 50/12 |
| 10,266,180 B1* | 4/2019 | Fields | B60W 50/045 |
| 10,324,463 B1* | 6/2019 | Konrardy | G01S 19/14 |
| 2008/0231461 A1* | 9/2008 | Sanchez | B60K 28/066 340/575 |
| 2016/0187879 A1* | 6/2016 | Mere | G05D 1/0061 701/23 |
| 2016/0195856 A1 | 7/2016 | Spero | |
| 2017/0291544 A1* | 10/2017 | Ishihara | B60K 35/00 |

\* cited by examiner

*Primary Examiner* — Hung T Nguyen
(74) *Attorney, Agent, or Firm* — Sheridan Ross P.C.

(57) ABSTRACT

Autonomous systems, such as vehicles being operated in a self-driving mode, may allow for human occupants to be inattentive to the operation of the system. However, events may occur that require a human user to perform an action. Systems and method are provided that enable an autonomous system to determine whether the system requires, or will require, a user action and whether the user is or is not attentive. If an action is required and the human is not attentive, an alerting protocol is executed to cause the system to perform actions that enable the user to be alerted, such as to enable the, now attentive, user to be able to perform the action.

19 Claims, 19 Drawing Sheets

AUTONOMOUS SYSTEM OPERATOR COGNITIVE STATE DETECTION AND ALERTING

FIELD

The present disclosure is generally directed to vehicle systems, in particular, toward autonomous vehicle systems.

BACKGROUND

In recent years, transportation methods have changed substantially. This change is due in part to a concern over the limited availability of natural resources, a proliferation in personal technology, traffic safety, and a societal shift to adopt more environmentally friendly transportation solutions. These considerations have encouraged the development of a number of new flexible-fuel vehicles, hybrid-electric vehicles, and electric vehicles.

Generally, drivers must remain alert to drive a vehicle. If the driver falls asleep or is distracted, the possibility of an accident is severely increased. Thus, some systems have been created to alert a driver when they fall asleep or become distracted. Additionally, autonomous and semi-autonomous vehicles are becoming more readily available. Unfortunately, these systems ignore the desires and cognitive capacities of the user, namely, to fall asleep or pay attention to something other than driving.

DETAILED DESCRIPTION

Figure 1:
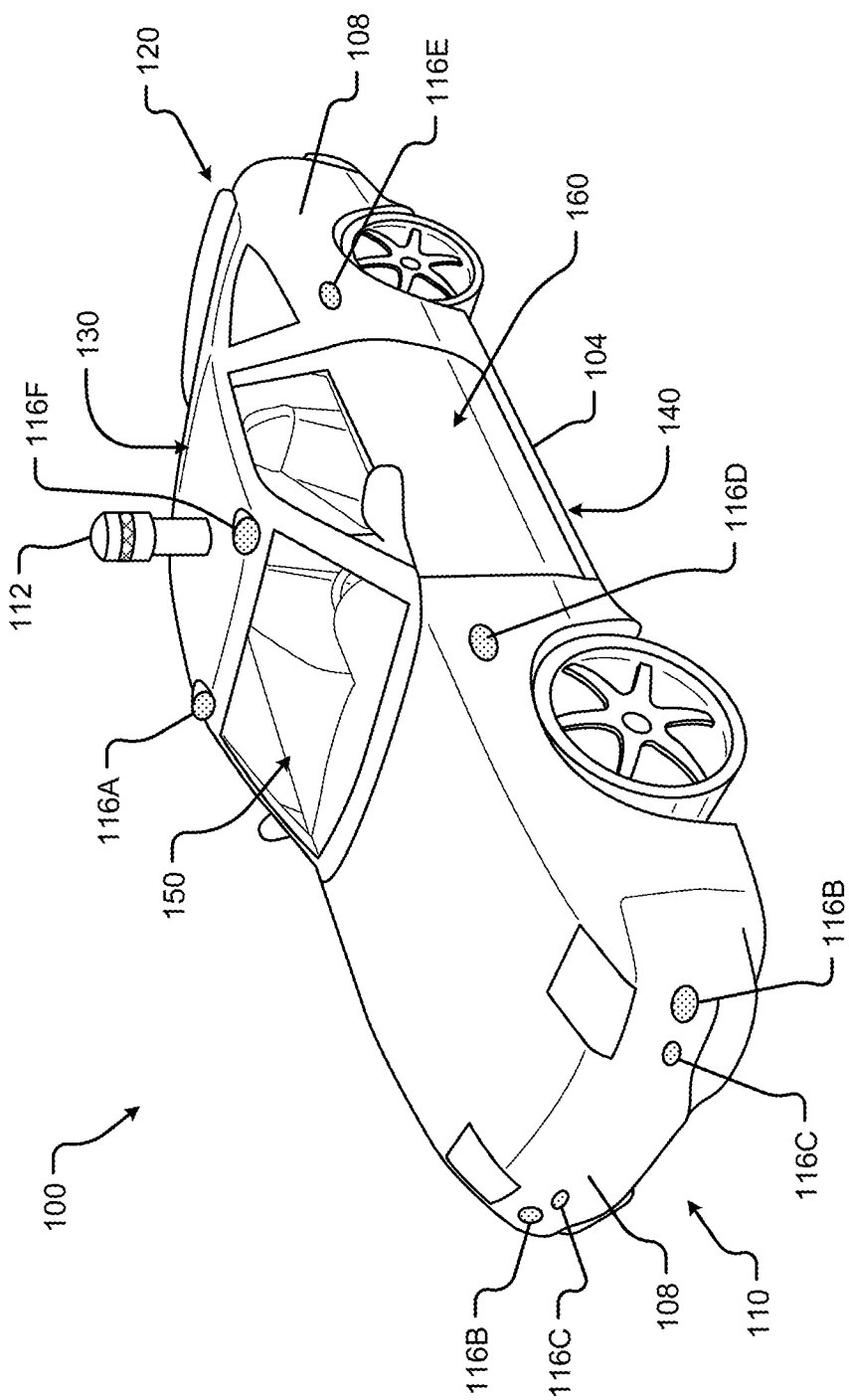
FIG. 1 shows a vehicle in accordance with embodiments of the present disclosure.

Embodiments of the present disclosure will be described in connection with a vehicle, and in some embodiments, a self-driving vehicle. Methods and systems herein can let an operator of an autonomous vehicle ignore the need to drive the vehicle. Thus, the driver can fall asleep, become distracted, or experience other cognitive or neural events that cause the driver to lose consciousness or the ability to control a motor vehicle. However, at appropriate times, rather that whenever the driver is asleep or distracted, the vehicle can alert the driver that their attention is required or wake the driver up. The alerts ensure the safe operation of the vehicle while allowing the driver to do what they are able and desire.

Until autonomous vehicles became a reality, drivers have never been able to safely sleep, close their eyes, mind wander, or otherwise engage in an alternative task (e.g. watching a movie) while the vehicle was moving. This is similar across many domains where people no longer actively control a system but instead monitor and intervene. In accordance with embodiments of the present disclosure, methods and systems are disclosed for detecting and measuring an operator of an autonomous system (e.g. an operator or passenger of an autonomous vehicle) who has their eyes closed, is fully asleep, or is engaging in an alternative task, and alerting or waking them up at appropriate or required times (e.g. they have reached their destination or the system state has changed). All known previous methods and systems have focused on preventing operators from becoming disengaged or falling asleep. Methods and system described herein allow operators to sleep or become otherwise disengaged from their primary operating task and ensures they are alerted or woken up at the appropriate time.

While operating an autonomous system an operator may cognitively disengage from operating or monitoring the system. Alternatively, the operator may purposely or inadvertently fall asleep during normal operations or monitoring. In accordance with embodiments of the present disclosure, the system, making use of a collection of diverse sensors in one or more sensor packages, a central processing system, and a collection of alarms/alerts will be able to detect driver state, determine whether it conflicts with the system's needs, and finally wake-up or alert the driver in the most effective way for the situation.

The sensor package is made up of a collection of sensors that either alone, or in combination with other sensors, can detect the appropriate behavioral or physiological indices of cognitive states that may conflict with the current needs of the system. Some examples of sensors that may be used individually, or in combination, are cameras that can be used for computer vision algorithms to detect face, eye, or other body positions of the autonomous system operator. Pressure or weight sensors in a seat may also be able to determine operator movement or position. Vehicle or other system data can also be used to determine how the driver is behaving. Additionally, if the system can be in frequent physical contact with the operator many physiological sensors may become practical. These can include (but are not limited to) electromyographs, goniometers, electrocardiography, capacitive skin sensors, electroencephalograph, functional near infrared spectroscopy, temperature, or other sensors that can acquire information about human physiology, cognition, or behavior.

Sensor outputs are processed by a central processing system. This processing consists of both basic signal processing (Fourier transformations, band pass filtering, etc.) in order to filter, clean, and/or combine the data for cognitive/behavioral state prediction through machine learning, neural net, or other processing algorithms. Once the operator's cognitive state is predicted it is considered in combination with system state information (system faults, etc.) and environment state (time of day, location, etc.) to decide whether the operator should be alerted/woken; if the operator should not be alerted/woken, what course of action should the autonomous system take; and what is the most appropriate method for alerting/waking the operator (e.g. quickly waking the operator vs. a low priority gentle wake-up sequence). The system described herein can also be used to provide additional system behaviors appropriate for the operator state. For example, the driver may have fallen unconscious and does not respond to the alerts. The system could then contact an emergency contact and/or change the automation state.

Once the system decides to wake/alert the system operator, the system then uses a combination of alerting modalities that can be used alone, in combination, or in a staged manner. For example, an autonomous vehicle reaches its destination and attempts to wake the operator by first turning on the interior lights of the vehicle (if it is night time), then plays an audible alert if the driver does not respond to the lights turning on, and finally a louder alert is played followed by the driver's seat automatically inclining. Alternatively, if the autonomous system encounters a critical error and requires the currently sleeping operator to take control, the system may first play a gentle auditory alert followed by vibrating the operator's seat. Once the operator has awoken or became responsive, they are prompted to respond to a confirmation prompt, which may be required in order to keep the vehicle from taking an action based on a non-responsive operator. If the operator has been asleep for an extended time the system may also suggest actions to refresh the operator, such as a by taking a break or obtaining a caffeinated food or beverage.

Methods and systems described herein are not solely focused on detecting and waking a sleeping driver, providing localized delivery of services, or heart rate monitoring and transmission. Rather, in accordance with embodiments of the present disclosure, the methods and systems may provide a detection and alerting capability for autonomous systems that determines whether there is a system event that requires attention; determines an autonomous system (e.g. automated car, automated train, aircraft, power plant control system, industrial monitoring system, etc.) operator's cognitive state (i.e. attentive, distracted, or asleep); determines the most appropriate course of action to get the desired response from the operator; confirms that the operator has responded or is able to respond to the system request; and/or potentially change the behavior of the automated system to accommodate the inattentive or sleeping operator if they are not alerted or woken up.

The methods and systems described herein provide methods of monitoring autonomous system operator's cognitive and behavioral states to alert or wake them at an appropriate time to respond to system prompts, monitor a situation, or take control of the system. Additionally, the system can determine the most appropriate way of waking or alerting the operator.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
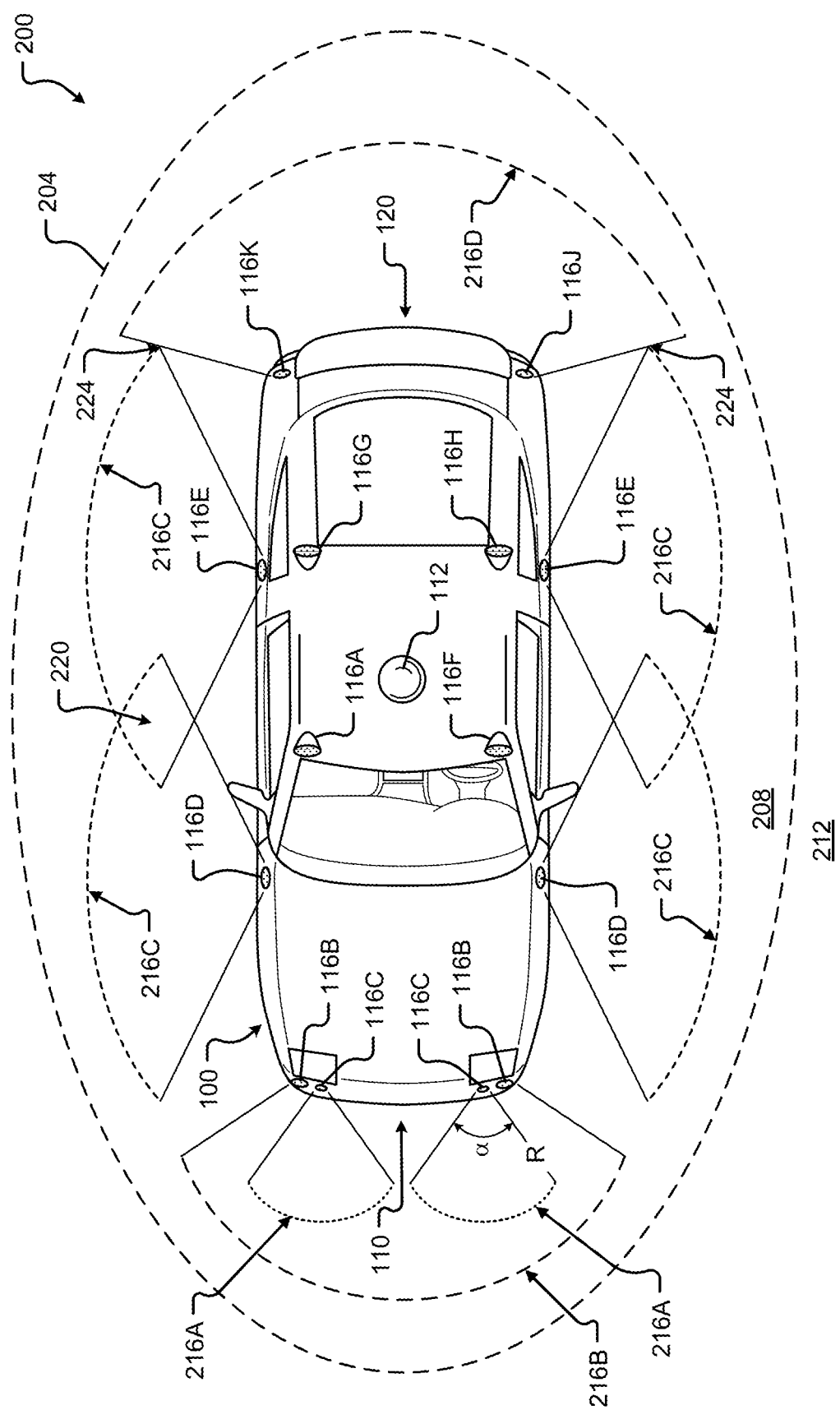
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
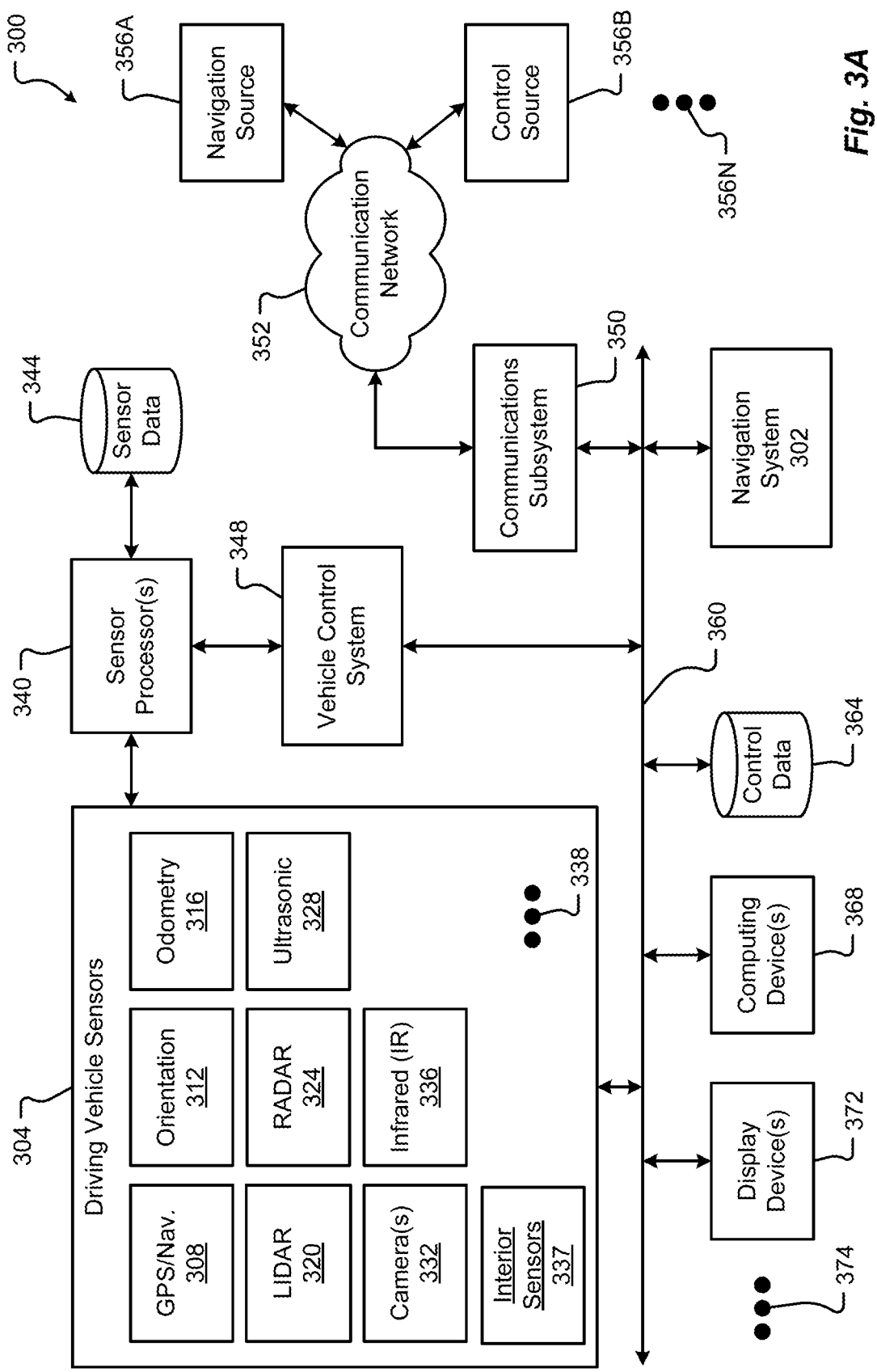
FIG. 3A is a block diagram of an embodiment of a communication environment of the vehicle in accordance with embodiments of the present disclosure.
Figure 3B:
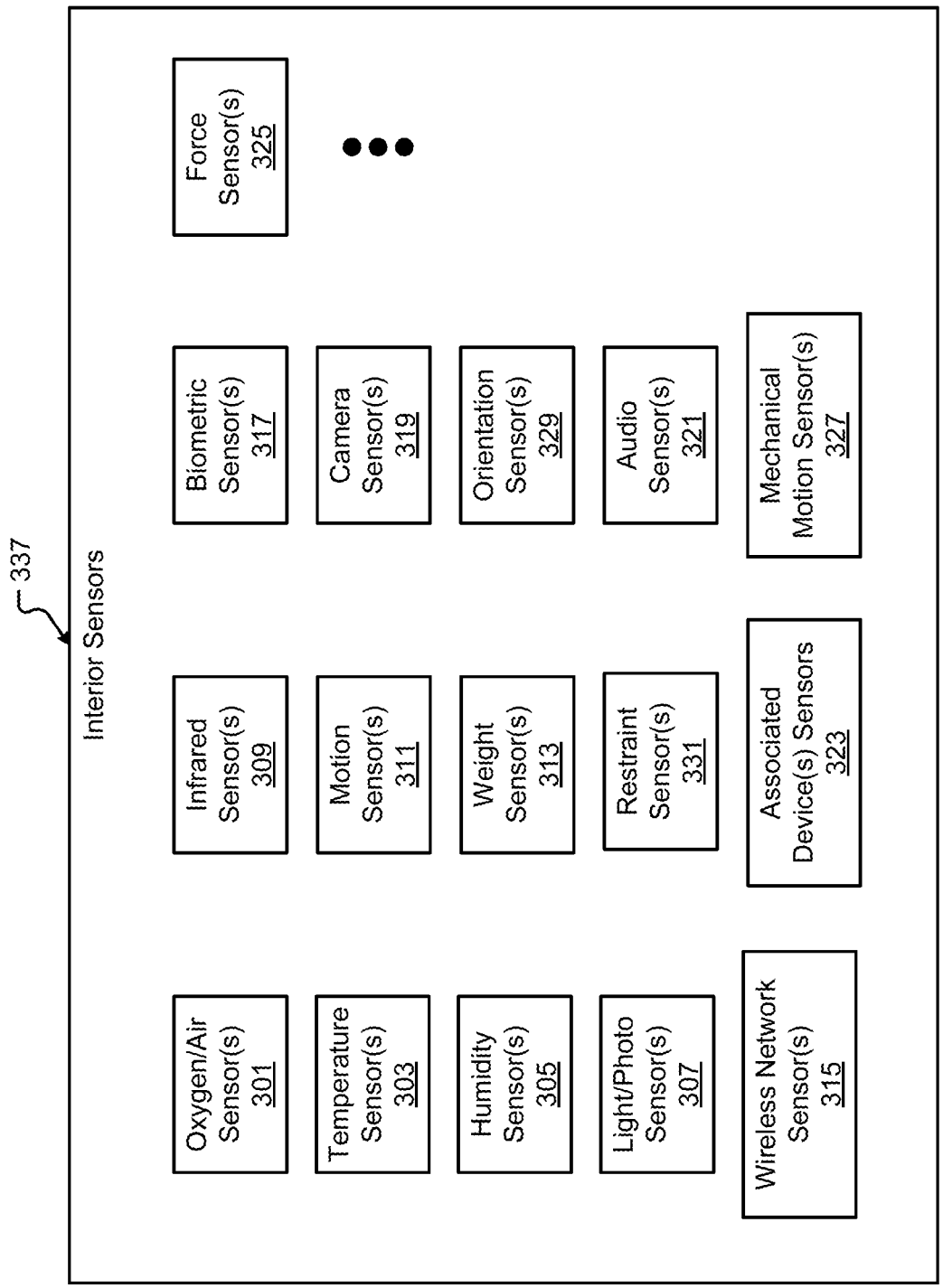
FIG. 3B is a block diagram of an embodiment of interior sensors within the vehicle in accordance with embodiments of the present disclosure.
Figure 3C:
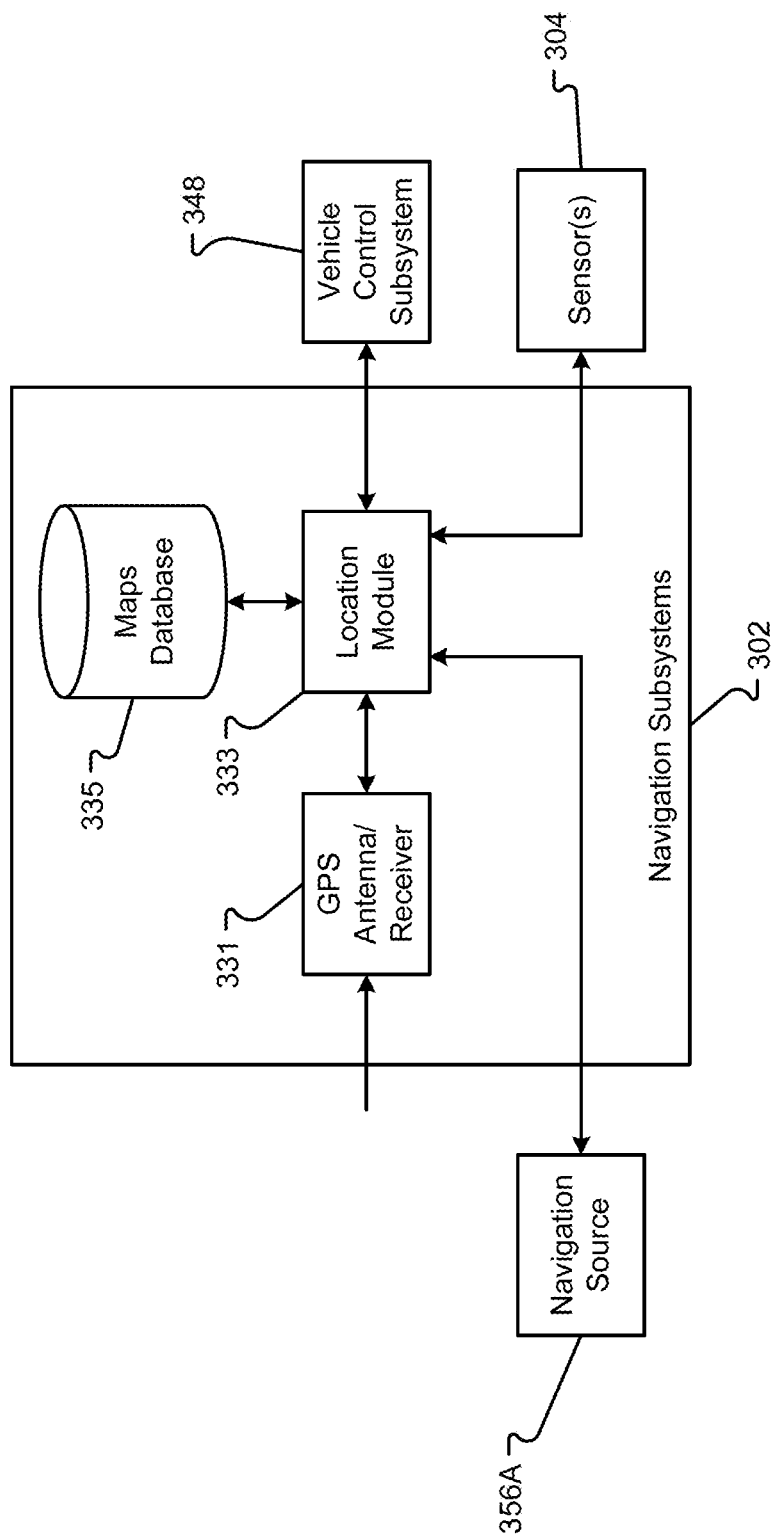
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensor 321 may be located in a first area of the vehicle 100 and a second audio sensor 321 may be located in a second area of the vehicle 100. If a sound is detected at a first volume level by the first audio sensors 321A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
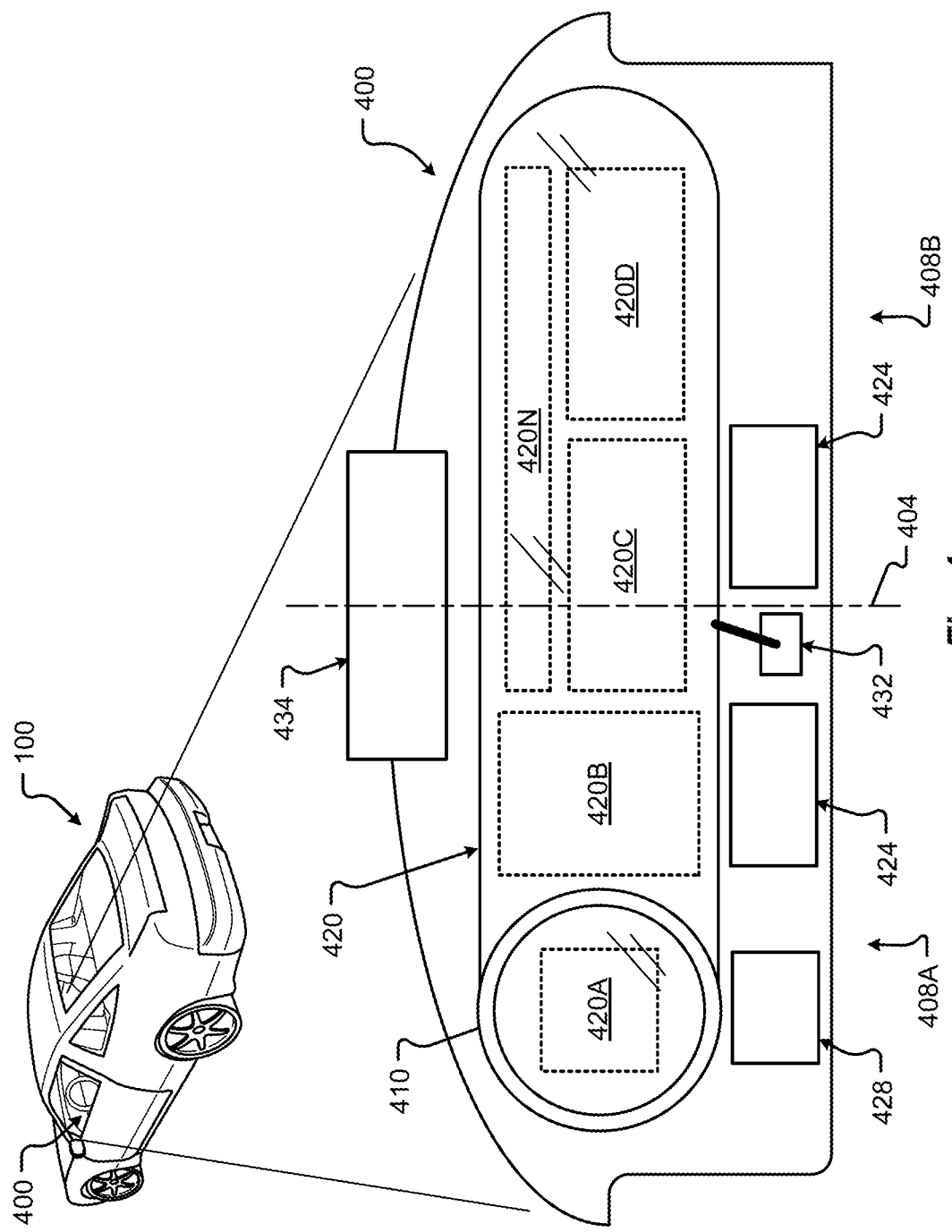
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
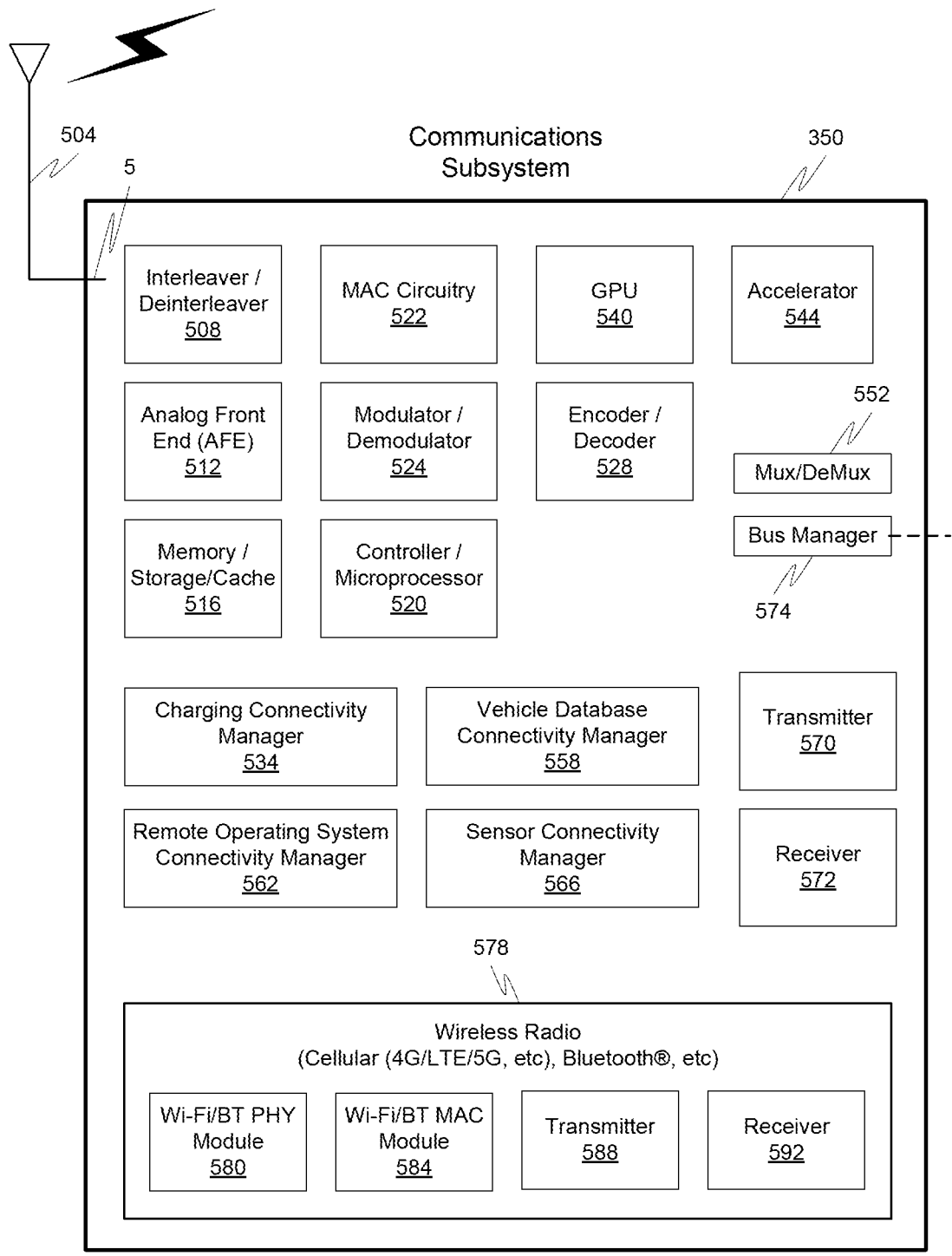
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with another vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long-term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
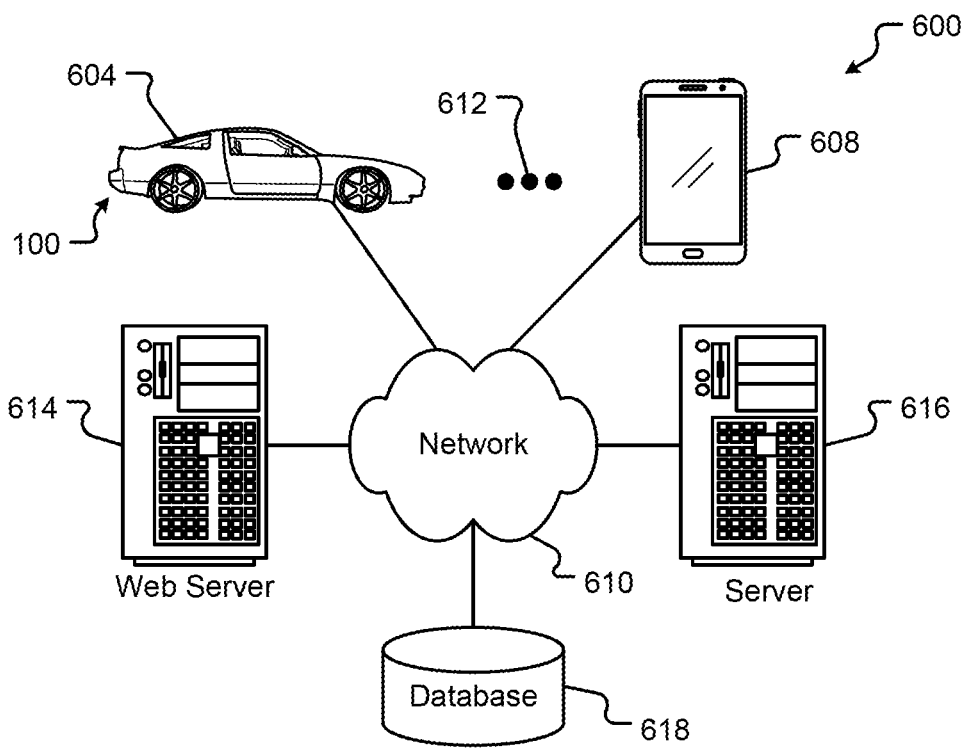
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
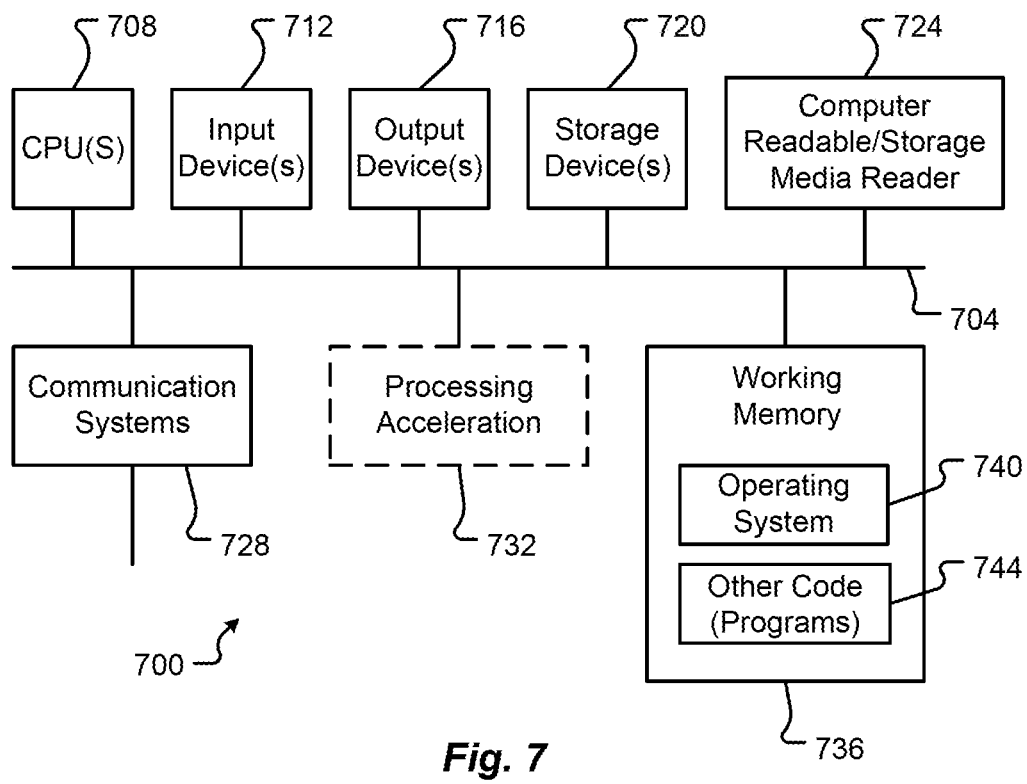
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8A:
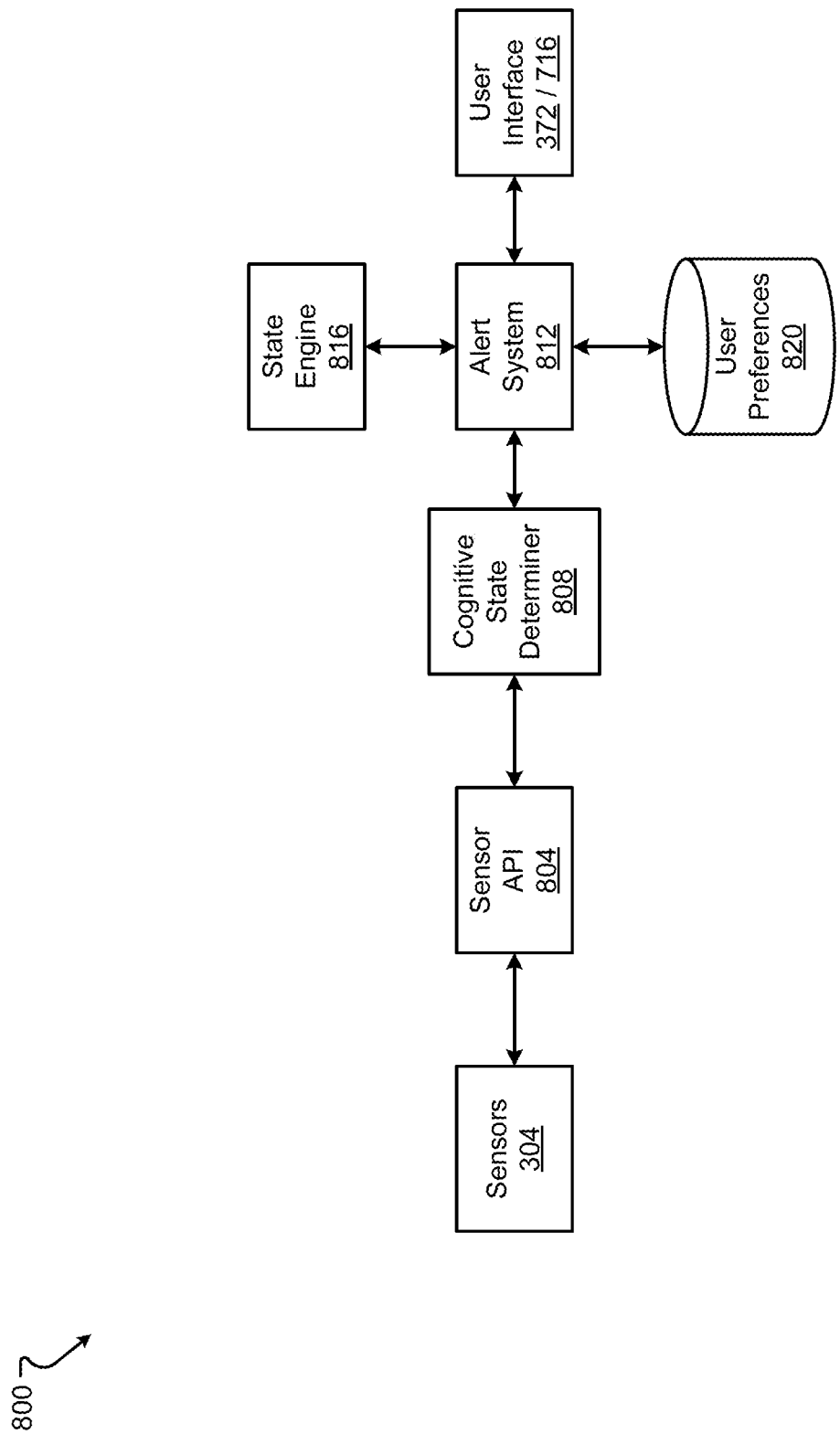
FIG. 8A shows a visual representation of an embodiment of a vehicle localization system in accordance with embodiments of the present disclosure.

FIG. 8A illustrates an embodiment of a system 800 for determining cognitive state of a user and alerting that user, when required, in accordance with embodiments of the disclosure. The system 800 can be hardware and/or software as described herein, including being executed on a processor 708 in a vehicle 100. The system 800 can include one or more of, but is not limited to, a sensor application programming interface (API) 804, a cognitive state determiner 808, an alert system 812, a state engine 816, user preferences data store or database 820, etc. There may be connections to both the user interface 372/716 and/or sensors 304. The various components 804-820 may be as described hereinafter in FIGS. 8B-9B.

Figure 8B:
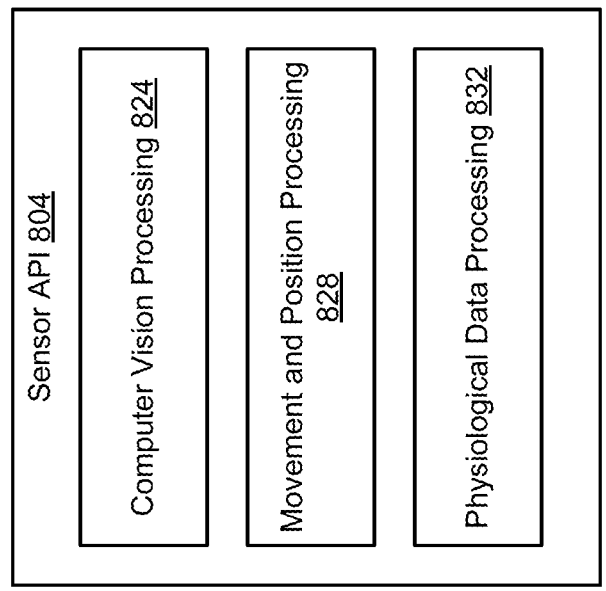
FIG. 8B shows another visual representation of an embodiment of a sensor API in accordance with embodiments of the present disclosure.

An embodiment of the sensor API 804 is illustrated in FIG. 8B. The sensor API 804 can be any hardware or software as described herein for processing sensor information or sensor signals from sensors 304. The sensor API 804 can include one or more of a computer vision processing 824, a movement and position processing 828, and/or physiological data processing 832. There may be more or fewer components to the sensor API 804, as shown in FIG. 8B.

The computer vision processing 824 can process visual signals from sensors 304. Visual sensors can include infrared sensors 309, motion sensors 311, light photo sensors 307, camera sensors 319, and possibly other sensors described in conjunction with FIG. 3B. The computer vision processing 824 can provide information about the sensor data to the cognitive state determiner 808. This information can include the state of a person, for example, whether the person is awake or sleeping, whether the person is paying attention to the road, whether the person is actively paying attention to a phone or other device, and/or conducting some other type of operation or event. This information may then be provided to cognitive state determiner 808 to determine what the state of the user is.

The movement and position processing 828 can process any movement sensor information. Thus, the movement and position processing 828 can interpret signals from the motion sensors 311, the orientation sensors 329, force sensors 325, or other sensors such as the weight sensor 313, etc. This information may then be used to determine whether a user is sitting in a position for driving or in some other position, such as laying down. This information may also be provided to the cognitive state determiner 808 to determine the attentiveness or state of the user.

Attentiveness is the ability for the driver to be aware of the present state of the vehicle and/or environment as may be observed with human senses (e.g., hear, see, and feel) and an ability to provide an appropriate response to the state observed. An appropriate response may be one to best address the observed state to preserve the health and safety of the driver, passengers, and other humans, animals, and property inside and outside vehicle 100 and/or to comply with a current condition or event on the roadway, operational issue with the vehicle, lawful operation, etc. An appropriate response may also have a timeliness aspect. For example, an object on the roadway may require an appropriate response (e.g., braking and/or steering) to either avoid the object or to minimize the impact with the object, as well as timeliness (e.g., initiate braking and/or steering in 0.5 seconds or less). Other appropriate responses may have a different timeliness aspect. For example, low fuel or battery charge may result in vehicle 100 becoming incapacitated within the next fifty miles of use. Accordingly, the appropriate response (e.g., charging/swapping batteries, obtaining fuel) is required before traveling more than fifty miles or traveling beyond the ability to reach a fueling/charging station. Similarly, an appropriate response may further require a degree of response (e.g., hard braking/steering in response to an object fifty feet ahead while traveling at seventy-five miles-per-hour, gradual braking/steering in response to an object fifty feet ahead while traveling at five miles-per-hour, etc.).

While a driver may be aware of the present state of the vehicle and/or environment and have the ability to make an appropriate response—humans are error prone and may either misjudge the present state of vehicle 100 and/or environment and/or react inappropriately. However, when the driver has the present ability to determine the state of vehicle 100 and/or environment and the ability to appropriately respond, the driver may be considered attentive or alert. In contrast, if the driver lacks the present ability to determine the state of vehicle 100 and/or environment and/or lacks the ability to appropriately respond, the driver may be considered inattentive or not alert.

Attentiveness may be determined by responsiveness (e.g., user is actively providing driving inputs to vehicle 100, user is responding correctly to alertness prompts, user indicates knowledge of the present state of vehicle 100 and/or environment, or active monitoring of the driver with eye tracking, etc.) and/or inattentiveness may also be determined. Inattentiveness may be determined by one or more sensor 304 determining the user state is inattentive, such as by observing the user sleeping, having eyes closed or directed towards a non-operational aspect of the vehicle 100 (e.g., infotainment system, personal entertainment device, etc.), a head and/or body position known to make attentiveness difficult or impossible (e.g., driver's seat fully reclined, seat sensor indicates the no weight in the operator's seat, etc.).

In one embodiment, sensor 304 is embodied as a user sensor. Sensor 304, when embodied as a user sensor senses at least one cognition-indicating attribute of a user, such as a driver of vehicle 100.

Further, the sensor API 804 can also include a physiological data processing 832 that also connects to or otherwise communicates with sensors 304. The physiological data processing 832 can obtain information from one or more user sensors, including but not limited to, oxygen air sensors 301, temperature sensors 303, humidity sensors 305, restraint sensors 331, weight sensors 313, motion sensors 311, biometric sensors 317, force sensors 325, orientation sensors 329, etc. and/or other component that may produce detect a cognition-indicating attribute of a user and output a user sensor signal in accord with the sensed cognition-indicating attribute. This information can then be used to determine what the physiological state of the user is. For example, if a user is sleeping, the user's heart rate may be lower, temperature may be cooler, or may be experiencing other physiological symptoms. These symptoms may be determined or recognized by the physiological data processing 832 to provide to the cognitive state determiner.

Figure 8C:
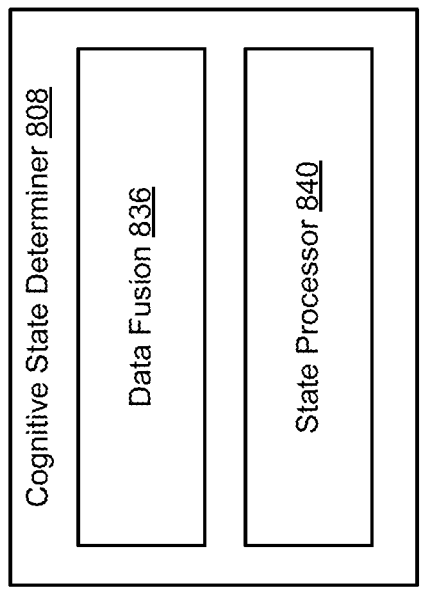
FIG. 8C shows another visual representation of a cognitive state determiner in accordance with embodiments of the present disclosure.

An embodiment of the cognitive state determiner 808 is illustrated in FIG. 8C. The cognitive state determiner 808 can be any type of hardware or software used to determine the cognitive state of the user. The cognitive state may be determined to be what level of focus the user is having on driving or on some other event or task not related to driving. Further, the cognitive state determiner 808 can determine whether the user is sleeping, inebriated, having a medical condition or some other function. Cognitive state determiner 808 can include one or more of a data fusion component 836, state processor 840. There may be more or fewer components to the cognitive state determiner 808 than those shown in FIG. 8C. In one embodiment, cognitive state determiner 808 may prompts user for an action as one means to determine a cognitive state. For example, a light on instrument panel 400 may illuminate or flash and monitor the eyes of the driver to determine if the user noticed and/or responded to the light. Similarly, music playing may be turned up or down, the interior temperature may be turned up or down, the operator's seat may move or vibrate, etc. and determine whether or not the user appeared to notice and/or respond to the prompting. Additionally or alternatively, the user may be a more explicit prompted, such as by a displayed and/or audio message asking the user to self-assess their state, such as by textually and/or audibly asking, "Are you awake?", "How alert (tired/sleepy) do you feel?", etc. And the user's response, or lack of, as observed by one or more interior sensors 337 then used by the cognitive state determiner 808 to determine the user's cognitive state.

The data fusion component 836 can take sensor data or data from other components through the sensor API 804 and fuse that data into a common information stream. Thus, the data fusion component 836 may change, manipulate, or transform any type of data from one format to another format. Further, the data fusion component 836 can put several different items of information from different sensors 304 into a common table or format for review by the state processor 840.

The state processor 840 can determine the state of the user based on sensor information provided from the data fusion component 836. The state processor can compare the information in the data fusion component 836 to previous state information or other types of information to determine if the user is currently paying attention to driving, sleeping, participating in a phone call, distracted, viewing multimedia, or some other activity. Further, the state processor 840 can also determine the state by determining eye positions, heart rate, temperature of the user, voice recognition information, or other types of sensor data. The state information may then be passed on to the alert system 812.

Figure 8D:
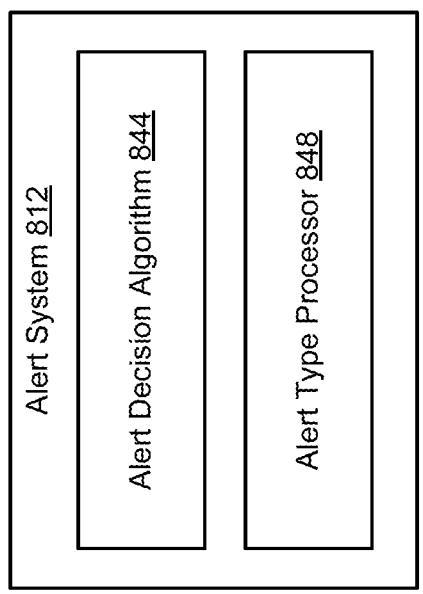
FIG. 8D shows another visual representation of an embodiment of an alert system in accordance with embodiments of the present disclosure.

An embodiment of the alert system 812 may be as shown in FIG. 8D. The alert system 812 can include one or more of, but is not limited to, an alert decision algorithm 844 and alert type processor 848. There may be more or fewer components in the alert system 812 than those shown in FIG. 8D. In one embodiment, alert decision algorithm 844 is or is a component of an alerting protocol.

The alert decision algorithm 844 determines whether an alert should be provided to the user through user interface 372/716. Here, the alert decision algorithm 844 can determine from information in the state processor 840 what the state of the user is. If the user is determined to be alert or otherwise paying attention, there may be no need to initiate or continue an alert or otherwise prompt the user to pay attention to operating the vehicle. However, if the user is not alert, the alert decision algorithm 844 can determine whether an alert may be sent based on the state of the user or if the alert should be delayed. If it is determined that the state of the user provided by the state processor 840 does not require an alert at this time, the alert algorithm may not send signal to send an alert. However, at some time thereinafter based on a change of circumstances with the vehicle or the user, an alert may be decided and then a signal may be sent to the alert type processor 848.

The alert type processor 848, may then determine and/or execute an alerting protocol. In accordance with the alerting protocol, alert type processor 848 may then send a signal(s) to the user interface 372/716 or some other system to carry out the alert(s) associated with the alerting protocol. The alert type processor 848 may determine the type of alert needed. For example, the alert type processor 848 can determine if the alert should be visual, audio, tactile, or some other type of alert. Further, the alert type processor 848 can determine whether the alert should be a combination and determine the forcefulness or aggressiveness of the alert. For example, if the user needs to wake up immediately, the alert may be louder, brighter, etc. than if the alert is waking a sleeping user slowly for the end of a trip or process. These types of situations may be determined by user preferences 820, which may store information about what type of alert the user may want depending on a situation. These user preferences 820 can be predetermined by a vehicle manufacturer or may be set by a user.

Figure 8E:
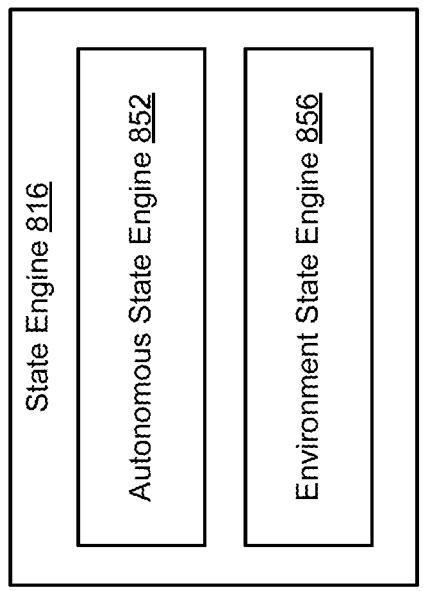
FIG. 8E shows another visual representation of an embodiment of a state engine in accordance with embodiments of the present disclosure.

A state engine 816 may be as shown in FIG. 8E. The state engine can include one or more of, but is not limited to, an autonomous state engine 852, an environment state engine 856. There may be more or fewer components to the state engine 816 than those shown in FIG. 8E. The state engine 816 determines the state of the vehicle. Thus, the autonomous state engine 852 can determine if the vehicle is in the autonomous driving mode or some form of autonomous driving. This information of the level of autonomy for the vehicle may be determined based on sensor information or input from the driving system 348. This information may be provided to the alert system 812 so that the alert decision algorithm 844 can determine if an alert is needed based on some kind of change or information about the autonomous state.

The environment state engine 856 can determine the driving environment for the vehicle 100. Thus, the environment state engine 856 can receive information from the sensors 304 or from driving system 348 to determine what the environment is or if there has been a change in the environment. For example, if the environment changed to heavy traffic or bad weather, the environment state engine 856 can change that information and alert the alert system 812 as to the change in environment to determine whether an alert needs to be sent to the user to react to the change in environment. The environment state engine 856 may then determine a system state of the autonomous system, such vehicle 100. The environment state engine 856 may then output a system state indicating whether a user's attention is, or will be, required, such as to manual operate 100 or a portion thereof that may have previously been operated autonomously. For example, vehicle 100 may be unable to maintain autonomous operation due to an anomaly navigation, hazard on the roadway, component anomaly, etc. that vehicle 100 is, or will, not be able to accommodate to maintain operation of vehicle 100 within the acceptable parameters of operation. A user's attention may be required for a user-specific event, such as to alert or wake the user to exit vehicle 100 upon arriving at the intended destination.

Figure 9A:
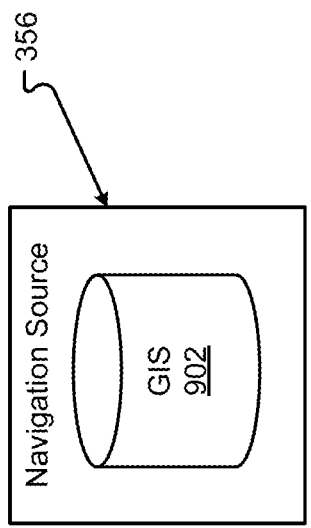
FIG. 9A is a diagram of an embodiment of a data store that stores localization data in accordance with embodiments of the present disclosure.
Figure 9B:
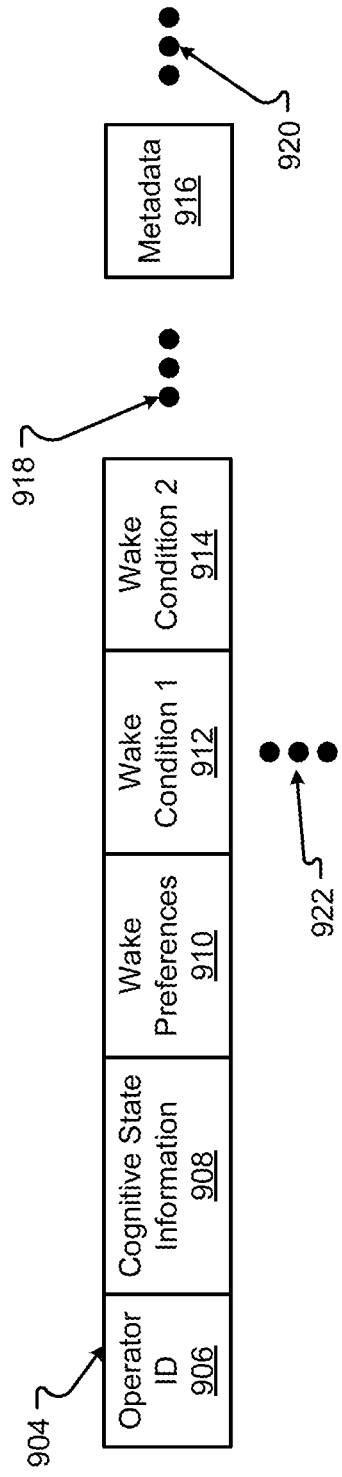
FIG. 9B is a diagram of an embodiment of a data structure that stores localization data in accordance with embodiments of the present disclosure.

An embodiment of information used for user preferences or other information in determining whether an alert needs to be given to a user based on the driving environment, user cognitive state, or some other information may be as shown in FIGS. 9A and 9B. FIG. 9A shows the navigation source as part of the vehicle control system 356. The navigation source may include GIS information 902, or other data, which provides for information about the driving system, traffic, weather, location, destination, waypoints, etc.

FIG. 9B can be user preference information that may be stored in user preferences data store 820. The user preferences data store 820 can include a data structure 904 that includes information about preferences for an operator. There may be more or fewer data structures 904 based on how many operators may use the vehicle 100, as represented by ellipses 922. The data structure can include one or more of, but is not limited to, an operator identifier (ID) 906, cognitive state information 908, wake preferences 910, wake condition one 912, wake condition two 914, and/or metadata 916. There may be more or fewer fields within each data structure 904, as represented by ellipses 920. Further, there may be more than two wake conditions 912, 914 within each data structure, as represented by ellipses 918. In one embodiment, one or more wave preferences 910 and/or wake conditions 912, 914 may form a portion of an alerting protocol. An alerting protocol may initiate a first wake condition (e.g., wake condition 914), in response to a first system state requiring the user's attention, such as to play a soft tone, return a reclined seat to an upright position, etc. The alerting protocol may have additional and/or alternative actions, such as in response to a user not responding (e.g., not indicating attentiveness, indicating inattentiveness) and/or a system state has become more urgent, a second wake condition (e.g., wake condition 914) may be performed. For example, the second wake condition may be more aggressive (e.g., play an alarm, vibrate the seat, drop the interior temperature, etc.). In another embodiment, vehicle 100, if unable to operate autonomously and not able to be operated by an attentive user, may execute a portion of an alerting protocol wherein vehicle 100 is shut down (e.g., a safe parking area is identified and vehicle 100 navigates to the area), notify emergency personnel (e.g., when unable to revive user), drive to a hospital, drive to a service facility, etc.

The operator ID 906 can be any type of ID to identify the operator. For example, the operator ID 906 can be a numeric, alphanumeric, globally unique identifier (GUID), or some other type of ID that uniquely identifies the user of the vehicle. Further, the operator ID 906 can include biometric or other information specific to the identity of the user. For example, the operator ID 906 can include facial recognition, voice recognition, fingerprint recognition, or other types of biometric or user-specific information.

The cognitive state information 908 can be a determination or information of past cognitive states and their associated sensor information. For example, if the user was sleeping previously on a previous trip, the cognitive state information 908 can include what sensor readings were included during that time and identification that the user was sleeping during that period. This cognitive state information 908 can then be used by the cognitive state determiner 808 to determine the state of the user based on past information. In other configurations, at least a portion of the cognitive state information 908 can be based off predetermined information or information from other users. Thus, the standard sensor readings for an average person in a certain cognitive state may be also stored and used to compare. This predetermined information may be used initially until a more exact representation of that user's cognitive states can be recorded and stored by the system.

Wake preferences 910 can include any type of information about how the user wishes to be woken or have their cognitive state changed based on a change in environment or activity. Thus, the wake preferences 910 can provide information to the alert type processor 848 about what type of alarm or alert is needed based on the change in condition. Accordingly, the wake preferences 910 can provide what type of alarm and associate that alarm type with an event or other thing that may be changed or occur for the user.

Wake conditions 912, 914 can be a determination of when the user should be woken or their cognitive state should be changed. These conditions can include, for example, what type of environment change, for example an increase of 50% more traffic, a change in weather from sunny to rainy or sunny to snowy, or some other type of change. If those wake conditions are elicited, then the user should have their cognitive state changed. While the wake conditions 912, 914 are listed as a wake condition, these can be conditions to change any type of cognitive state, including distracted driving or other types of conditions. Thus, for each type of condition and user state, there may be a different condition. These wake conditions can be predetermined by a vehicle manufacturer, a third party, or may be set by a user.

Metadata 916 can be any information about previous cognitive states or driving information that may be useful in determining when a user should be alerted. This metadata can include the changes in the user or how the user receives such an alert when woken in previous situations. Further, the metadata 916 can be associated with certain times, dates, or locations for waking preferences.

Figure 10:
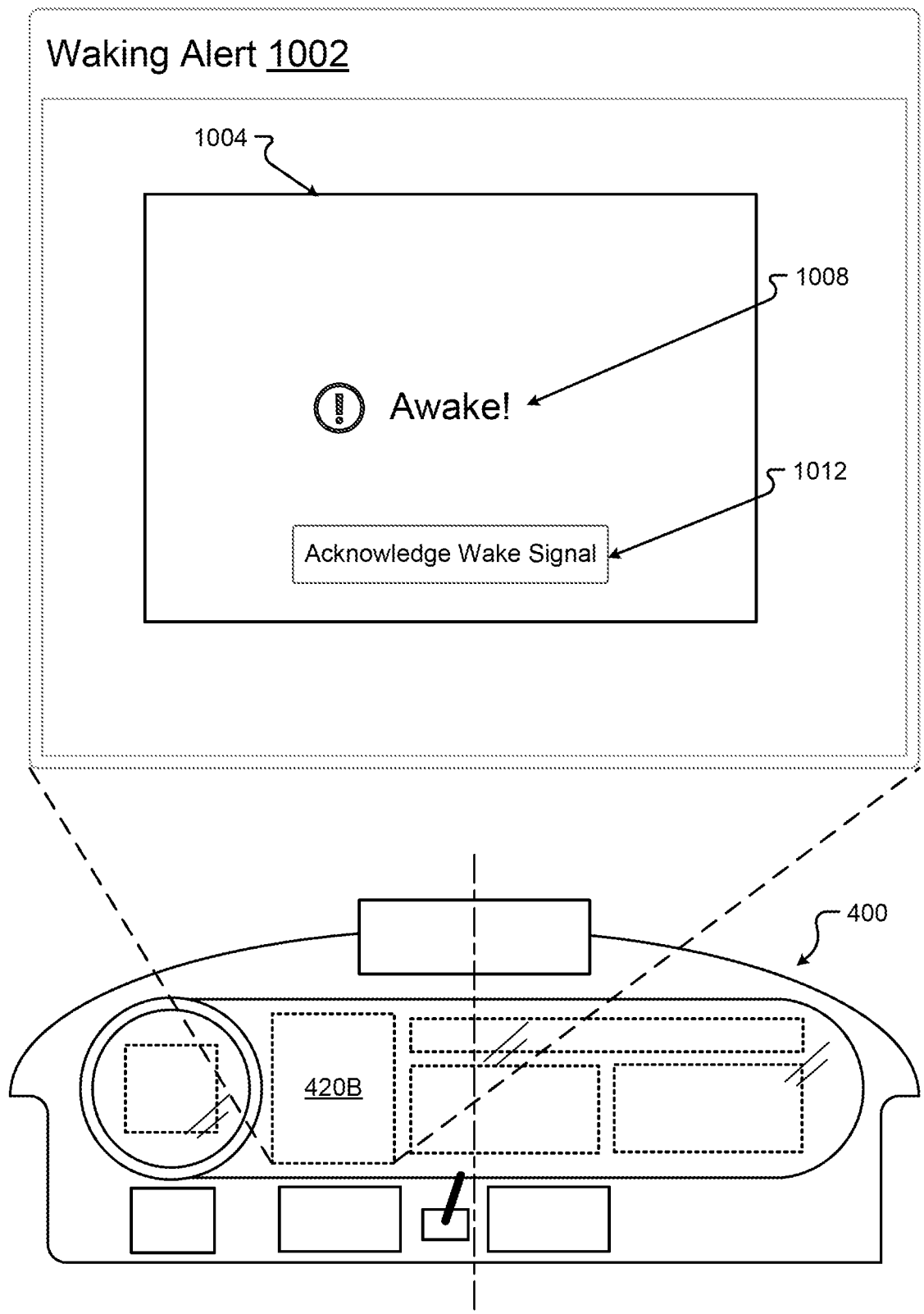
FIG. 10 is a diagram of an embodiment of a component with a display in accordance with embodiments of the present disclosure.

An embodiment of a user interface that may be provided in a user interface 420B of instrument panel 400, or other user interface, is illustrated in FIG. 10. The user interface 420B may include a waking alert window 1002 or some other display within a user interface. The window 1002 can include a pop-up notification 1004 that includes an alert 1008. Here, the alert is to wake the user. This user interface notification 1004 can flash and be accompanied with one or more other types of alerts provided by one or more components of the vehicle. For example, a chime, buzz, beep, etc. can be played through the speakers of the vehicle. The horn can be honked by the vehicle to wake the user. In other confirmations, there may also be a tactile alert such as a vibration of the seat, steering wheel, or other type of tactile alert. Further, the vehicle control system 348 can change the current environment of the vehicle, including turning on the air conditioning to cool the vehicle or causing some other kind of change that may cause discomfort and change of cognitive state of the user. The notification 1004 can also include a user interface device 1012 that can be selected by a user through the user interface 420B. This device may be an acknowledged wake signal input that allows the vehicle control system 348 to understand that the user has changed their cognitive state and recognizes the wake notification 1004.

Figure 11:
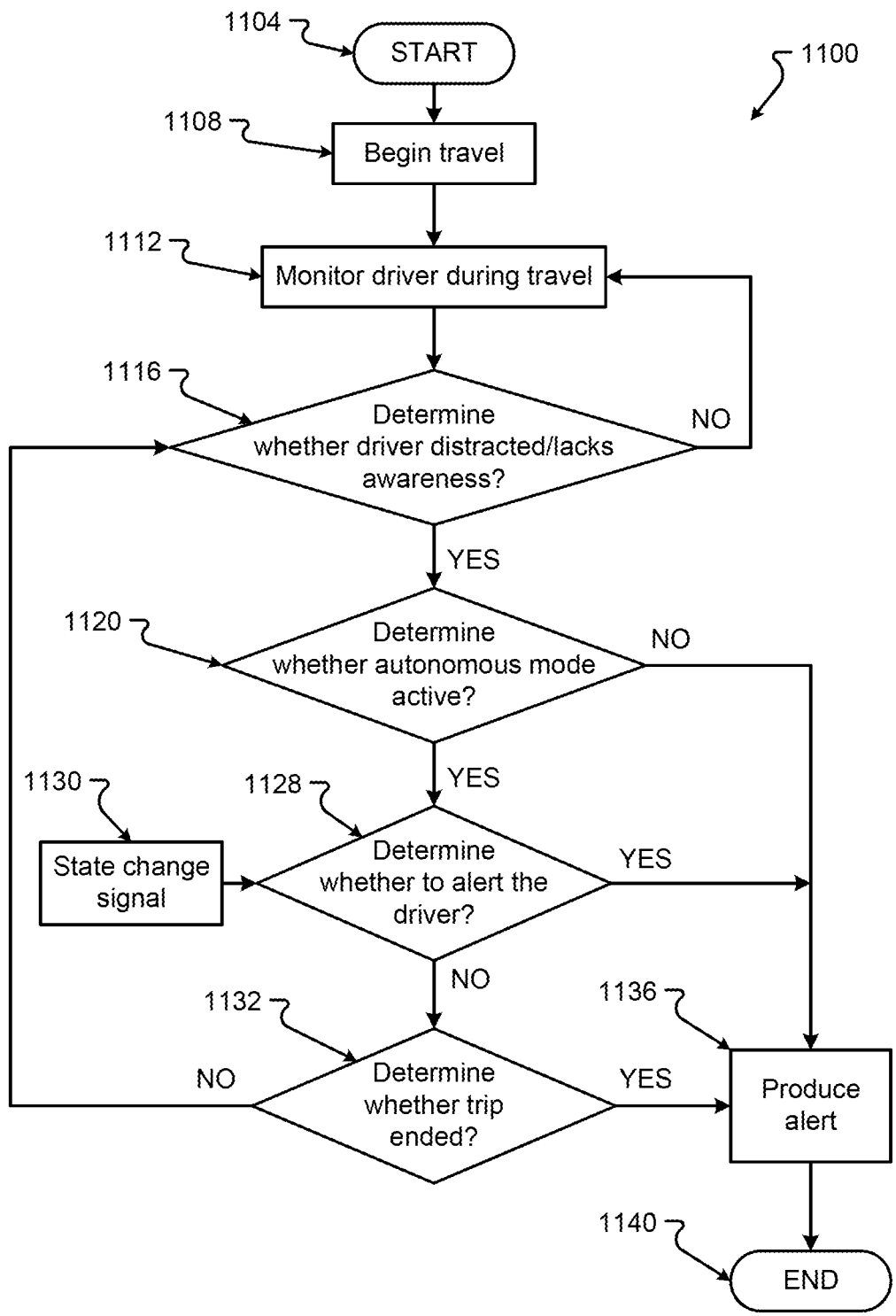
FIG. 11 is a process diagram of an embodiment in accordance with embodiments of the present disclosure.

An embodiment of a method 1100 for providing alerts or change of cognitive state of the user may be as shown in FIG. 11.

The method may start at 1104 and a user may begin travel in step 1108. Here, the vehicle may be started and the user can proceed along a route. During this time, the cognitive state system 800 may monitor the driver during travel in step 1112. For example, as explained in conjunction with FIGS. 8A-8D, the cognitive state determiner 808 can receive sensor information 304 through a sensor API 804. This sensor information may be used to determine by the state processor 840 what the state of the driver is. Thus, the sensor API 804 can receive sensor information and modify that information with the computer vision processing component 824, the movement and position processing component 828, the physiological data processing component 832, and provide that information to the data fusion component 836. The data fusion component 836 can modify any of this information from the sensor API and provide it into a single data structure or stream to the state processor 840. The state processor 840 can then monitor what the state of the user or driver is during the travel.

The state processor 840 then can determine whether the driver is inattentive in step 1116. Here, the state processor 840 may compare the state of the user to the cognitive state information 908 in data structure 904 to determine if the user's cognitive state is distracted or inattentive. If there is a comparison, the method 1100 proceeds YES to step 1120. However, if it appears that the user is not distracted or is attentive and driving normally, the method 1100 may proceed NO back to step 1112. Thus, the state processor can continually determine whether the driver is distracted or inattentive in step 1116.

In step 1120, the state engine 816 can determine whether the vehicle is in autonomous mode. Thus, the autonomous state engine 852 can receive information from the vehicle control system 348 to determine whether the vehicle is currently in autonomous mode. If the vehicle is in autonomous mode, the method 1100 may proceed YES to step 1128. However, if the vehicle is not in autonomous mode as determined by the autonomous state engine 852, a method 1100 may proceed NO to step 1136. Thus, the autonomous state engine 852 can send a signal to the alert system 812 if the vehicle is in or out of autonomous mode.

While in autonomous mode, the alert system 812 can determine whether to alert the driver in step 1128. As such, the vehicle may continue in autonomous mode and can make a determination of whether or not the cognitive state of the user is pertinent to the current driving situation. Thus, the alert decision algorithm 844 can receive information from sensors, user preferences 820, etc. to determine if the driver should be alerted while in autonomous mode. If the user does not need to be alerted during autonomous mode, then the alert decision algorithm 844 can determine that no alert is needed and the method 1100 can proceed NO to step 1132. In step 1132, the alert system 812 can determine whether a trip is ended. This may be determined by receiving information from the navigation system or from reaching the destination as provided by the user. If the trip has ended, then the method proceeds YES to step 1136. If the trip has not ended, the method 1100 proceeds NO back to step 1116 to continue to monitor the driver and the mode of the vehicle. During this loop, if there is a state change signal 1130, that may be introduced to decision 1128 produced by the alert system. A state change can be any change provided by the cognitive state determiner 808 through sensor information and produced by the state processor 840. Further, there may be changes in the autonomous state provided by the autonomous state engine 852 or in the driving environment provided by environment state engine 856. Any state change signal either to the vehicle or the driver may be generated in step 1130 and provided to the alert system 812, which may then again determine whether or not to alert the driver in step 1128. However, if the state change does not require an alert of the driver, the method again proceeds NO to step 1132. However, if at any time that the alert decision algorithm 844 determines that the driver should be alerted, the method 1100 proceed YES from step 1128 to step 1136. In step 1136, the alert decision algorithm 844 determines that the vehicle must produce an alert. The type of alert may be determined by the alert type processor 848. The alert system 812 may then send a signal to the user interface 372/716 or to one or more other vehicle systems through the vehicle control system 348. The user interface wake alert 1002 as provided in FIG. 10 may be provided on a user interface such as user interface 420B. Further audible or tactile alarms may be provided to produce the alert 1136 to change the cognitive state of the user. These alarms may continue until the user's cognitive state is changed. Thus, the method 1100 allows for the user to be distracted or fall asleep during autonomous mode driving and does not necessarily need to produce an alarm every time the cognitive state of the user changes or is detrimental to the driving experience as the vehicle can provide for autonomous driving while the user is distracted.

Figure 12:
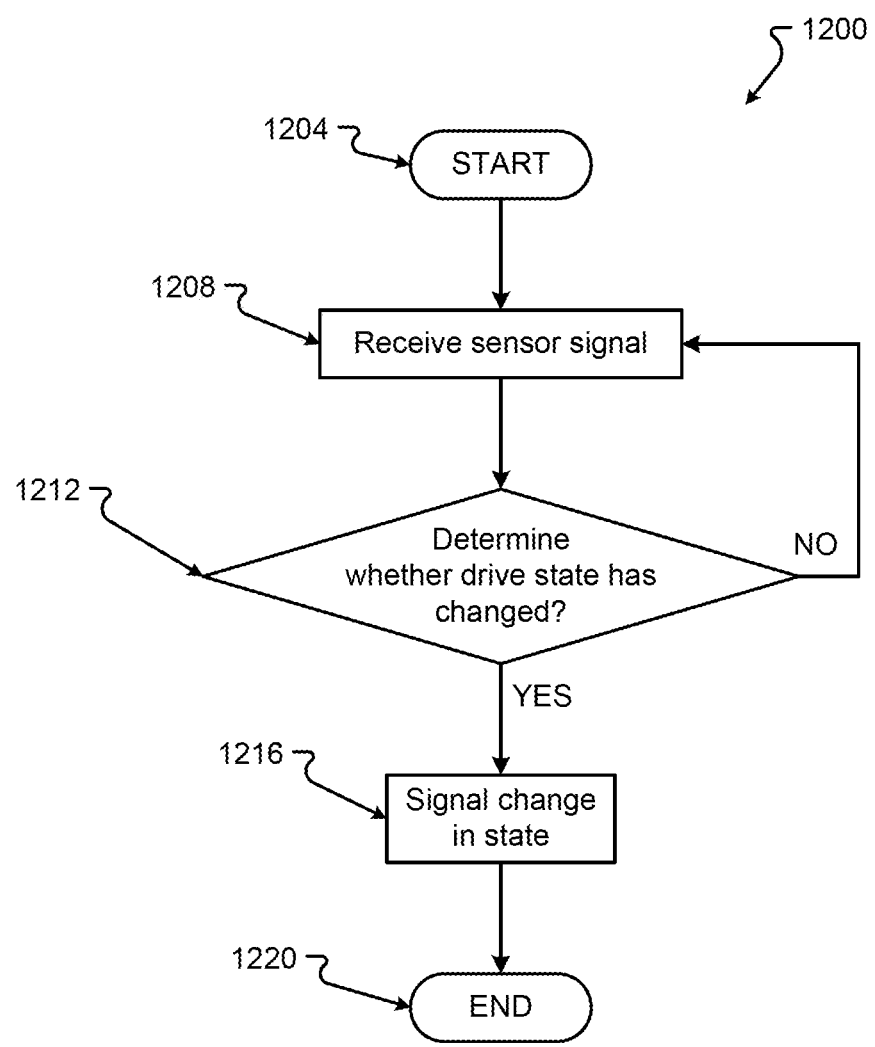
FIG. 12 is a process diagram of an embodiment in accordance with embodiments of the present disclosure.

An embodiment of a method 1200 for determining a change in driver state may be as shown in FIG. 12. The method 1200 may being at step 1204 and the cognitive state determiner 808 can receive sensor signals in step 1208. Here, a sensor API 804 can receive sensor signals from sensors 304. The sensor API can then compute or modify the signals through the computer vision processing component 824, the movement and position processing component 828, and the physiological data processing component 832. Thus, based on the type of type of sensor, one of the components 824-832 can process the signal. This information may then be consolidated and sent to the cognitive state determiner 808. The data fusion component 836 or the cognitive state determiner 808 can then fuse the data from the various processing functions 824-832. This information, as a consolidated stream, can be sent to the state processor 840. The state processor 840 can then determine whether the driver's state has changed in step 1212. Here, the processing or the information from the data fusion component 836 can be compared to data 908 to determine if a different cognitive state has been sensed. For example, if the user's eyes are open but were previously closed, the user may be awake when they were previously sleeping. Other types of changes may have occurred that may be evaluated by the state processor 840. If the state of the user has changed, the method flows YES to step 1216. However, if the state has not changed, the method 1200 proceeds NO back to step 1208 to continue to monitor the state of the driver.

In step 1216, the state processor may send a signal to the alert system 812 to signal the change in state. This signal can be an interrupt or some other type of signal that may be received by the alert system 812 in step 1130.

Figure 13:
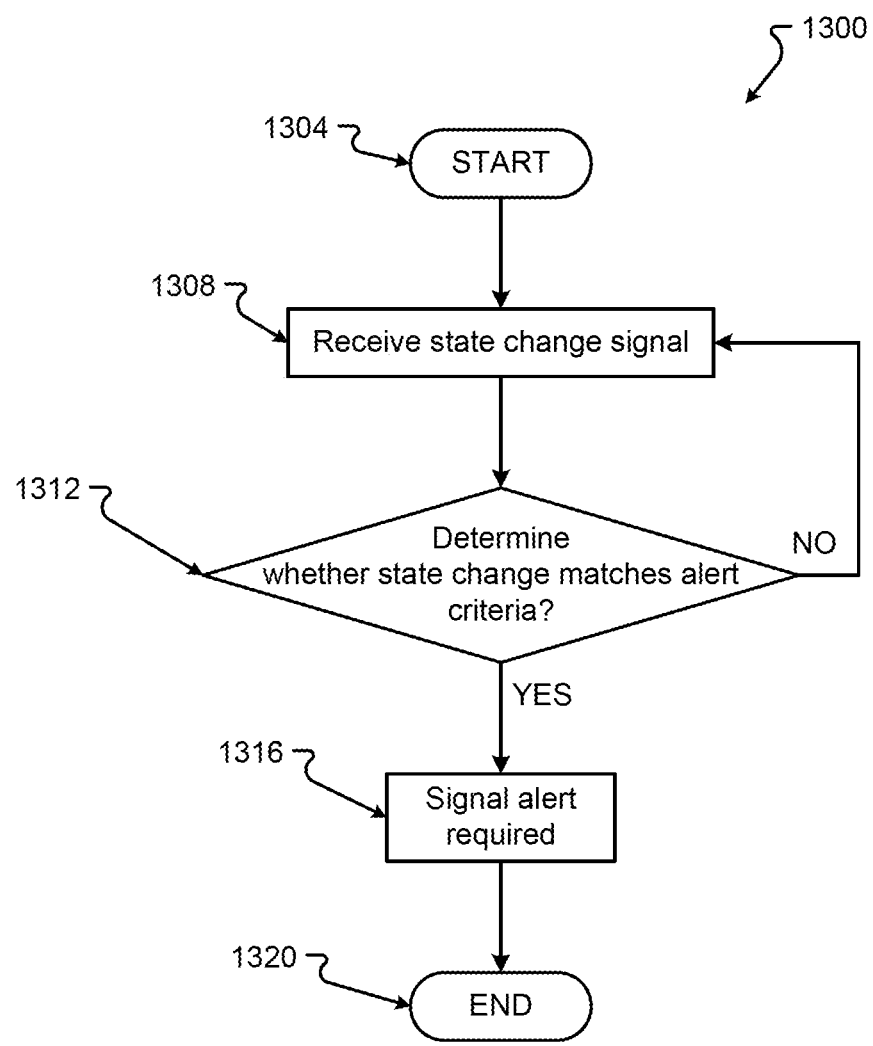
FIG. 13 is a process diagram of an embodiment in accordance with embodiments of the present disclosure.

An embodiment of a method 1300 for determining by the alert system 812 whether an alert is needed may be as shown in FIG. 13. In one embodiment, method 1300 may be being at 1304 and the alert system 812 can receive a state change signal in step 1308. Here, as explained in conjunction with FIGS. 11 and 12, the cognitive state determiner 808 can send a signal in step 1130 which may be received by the alert system 812 in step 1308. This signal may be sent to the alert decision algorithm 844. Further, the state engine 816 may also send a signal of a change in the state of the vehicle or in the environment the vehicle is driving in. One of these signals may then be used to determine whether a state change matches an alert criterion in step 1312.

Here, the alert decision algorithm may compare the state change or the change in data or current state and other information to user preferences 820. For example, the user preferences can include wake preferences 910 or wake conditions 912, 914. The situation or the data received, including the state change, may be compared to such data 910-914. If one of the wake preferences or wake conditions is met, the method 1300 will proceed YES to step 1316. However, if the state change does not match any of the alert criteria in data 910-914, the method 1300 may proceed NO back to receiving a state change signal 1308 to react to the next state change signal received by the alert system 812.

In step 1316, if an alert is required, the decision algorithm 844 instructs the alert type processor 848 to send the alert or signal that an alert is required. The alert type processor 848 can determine the type of alert and instruct the user interface 372/716 or other devices within the vehicle through the vehicle control system 348 to provide the alert. Thus, the signal provided for the alert can provide what type of alert, when the alert should be sent, how, how it should be responded to, and other information.

Figure 14:
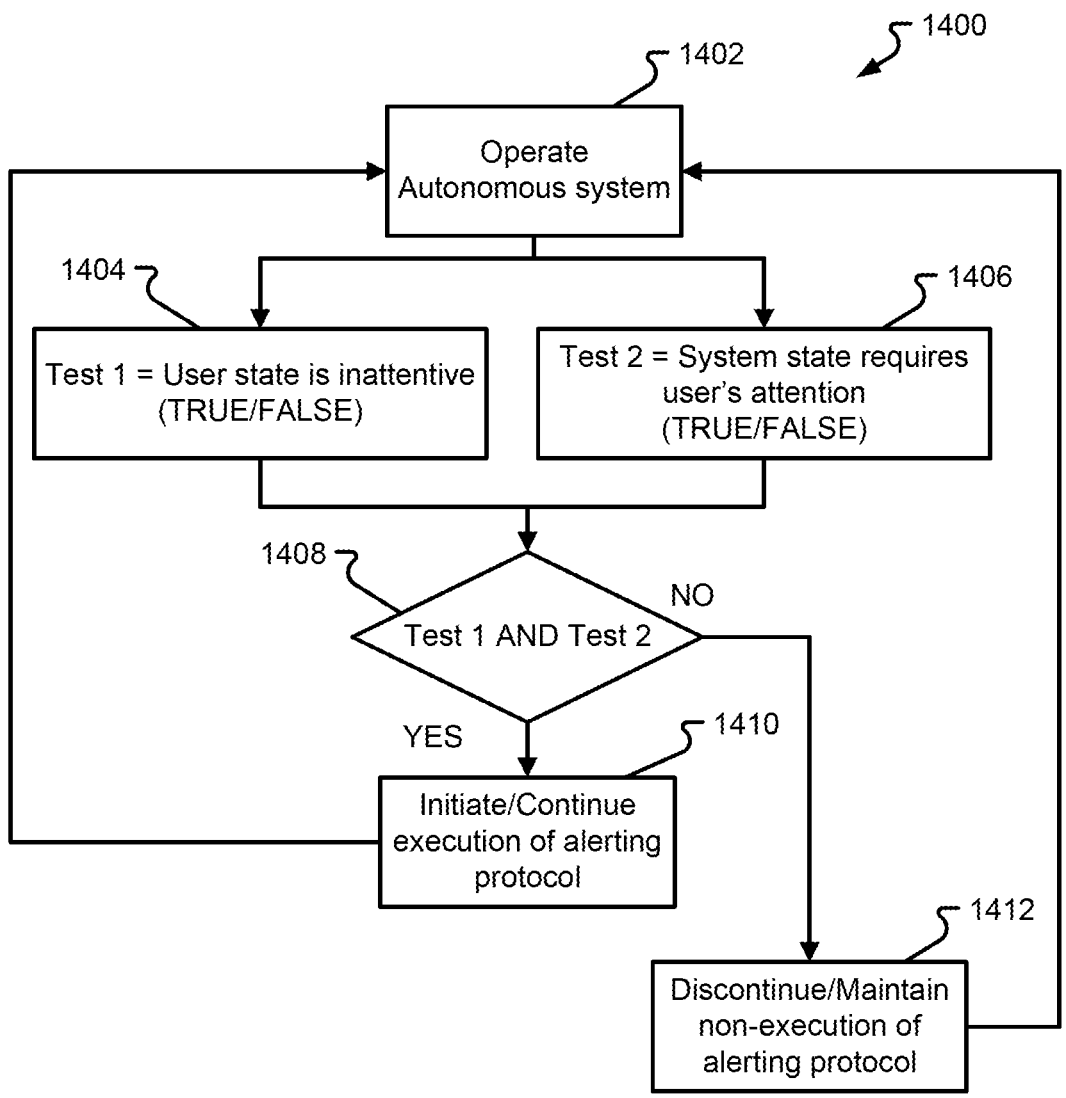
FIG. 14 is a process diagram of an embodiment in accordance with embodiments of the present disclosure.

FIG. 14 illustrates process 1400 in accordance with embodiments of the present discloser. In one embodiment, process 1400 is executed by a processor, such as one or more of CPU(s) 708. Process 1402 is the operation of an autonomous system, such as driving vehicle 100. Steps 1404 and 1406 may be performed in series or parallel. Step 1404 performs a test to determine the user's current state, such as by the processor receiving an output signal from one or more user sensors, such as sensor 337 when configured to observe at least one cognition-indicating attribute. Step 1406 performs a test to determine the system's state, such as whether vehicle 100 requires or will require an input from the user. Test 1408 determines if both the user is inattentive and the system requires attention and, if true, executes step 1410 whereby the alerting protocol is initiate. If the alerting protocol is already initiated step 1410 may continue the alerting protocol. Alerting protocol 1410 may have one or more alternative or additional alerting options such as to escalate the waking in accordance with an urgency, failure to wake the user after a predetermined period of time, etc. If step 1408 is determined in the negative, step 1412 may then execute to perform no action, such as when the alerting protocol is not being executed, or to discontinue the alerting protocol, when the alerting protocol is being executed.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a feature vector node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a feature vector sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the feature vector function, and the feature vector software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to feature vector standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle, comprising: a sensor to sense an environment surrounding the vehicle, wherein a feature vector describes at least a portion of the environment at a current location of the vehicle on a route; a processor in communication with the sensor, the processor to: receive information from the sensor regarding the feature vector; retrieve feature vector information associated with two or more segments of a route of travel for the vehicle; compare the received feature vector to the retrieved feature vector information; determine if the received feature vector to the retrieved feature vector information match; and if the received feature vector to the retrieved feature vector information match, determine that the current location of the vehicle is at a segment location of the segment associated with the retrieved feature vector information.

Any of the one or more above aspects, wherein the feature vector is a portion of a machine view of the environment obtained by the sensor.

Any of the one or more above aspects, wherein the received feature vector is compared visually to the retrieved feature vector information.

Any of the one or more above aspects, wherein the route is delineated into two or more segments.

Any of the one or more above aspects, wherein each segment has a known segment location.

Any of the one or more above aspects, further comprising the processor to determine a preliminary location to reduce a number of segments retrieved to compare to the received feature vector.

Any of the one or more above aspects, wherein the preliminary location is determined by a GPS signal, by dead reckoning, by visual odometry, and/or by particle filtering.

Any of the one or more above aspects, further comprising the processor to determine a next segment to compare to a next received feature vector based on a vector of travel for the vehicle.

Any of the one or more above aspects, wherein the next received feature vector is obtained by the sensor after the vehicle has traveled to a next location.

Any of the one or more above aspects, further comprising the processor to repeat one or more of: receive next information from the sensor regarding the next feature vector; retrieve next feature vector information associated with two or more next segments of the route of travel for the vehicle; compare the next received feature vector to the next retrieved feature vector information; determine if the next received feature vector to the next retrieved feature vector information match; and if the next received feature vector to the next retrieved feature vector information match, determine that a next current location of the vehicle is at a next segment location of the next segment associated with the next retrieved feature vector information.

Any of the one or more above aspects, further comprising the processor to, after determining the segment location, determine a new feature vector in view of the sensor.

Any of the one or more above aspects, further comprising the processor to characterize the new feature vector.

Any of the one or more above aspects, further comprising the processor to provide the new feature vector to another vehicle to aid the other vehicle in determining the location at the segment.

Embodiments further include a method comprising: determining, by a processor, a preliminary location of a vehicle on a route of travel, wherein the route of travel is delineated into two or more segments. receiving, by the processor, information, from a sensor, wherein the sensor senses an environment surrounding the vehicle, wherein the information comprises a feature vector, wherein the feature vector describes at least a portion of the environment at a current location of the vehicle; retrieving feature vector information associated with the two or more segments of the route of travel for the vehicle; comparing the received feature vector to the retrieved feature vector information; determine if the received feature vector to the retrieved feature vector information match; and if the received feature vector and the retrieved feature vector information match, determining that the current location of the vehicle is at a segment location of the segment associated with the retrieved feature vector information.

Any of the one or more above aspects, wherein the feature vector is a portion of a machine view of the environment obtained by the sensor, and wherein the received feature vector is compared visually to the retrieved feature vector information.

Any of the one or more above aspects, wherein the route is delineated into two or more segments, and wherein each segment has a known segment location.

Any of the one or more above aspects, wherein determining the preliminary location of the vehicle reduces a number of segments retrieved to compare to the received feature vector, and wherein the preliminary location is determined by a GPS signal, by dead reckoning, by visual odometry, and/or by particle filtering.

Any of the one or more above aspects, further comprising: determine a next segment to compare to a next received feature vector based on a vector of travel for the vehicle, wherein the next received feature vector is obtained by the sensor after the vehicle has traveled to a next location; repeating one or more of: receiving next information from the sensor regarding the next feature vector; by retrieving next feature vector information associated with two or more next segments of the route of travel for the vehicle; comparing the next received feature vector to the next retrieved feature vector information; determining if the next received feature vector to the next retrieved feature vector information match; and if the next received feature vector to the next retrieved feature vector information match, determining that a next current location of the vehicle is at a next segment location of the next segment associated with the next retrieved feature vector information.

Any of the one or more above aspects, further comprising: after determining the segment location, determining a new feature vector in view of the sensor; characterizing the new feature vector; and providing the new feature vector to another vehicle to aid the other vehicle in determining the location at the segment.

Embodiments further include a non-transitory computer readable medium having instructions stored thereon that when executed by a processor of a vehicle cause the processor to perform a method, the method comprising: determining, by a processor, a preliminary location of a vehicle on a route of travel, wherein the route of travel is delineated into two or more segments; receiving, by the processor, information, from a sensor, wherein the sensor senses an environment surrounding the vehicle, wherein the information comprises a feature vector, wherein the feature vector describes at least a portion of the environment at a current location of the vehicle; retrieving feature vector information associated with the two or more segments of the route of travel for the vehicle; comparing the received feature vector to the retrieved feature vector information; determine if the received feature vector to the retrieved feature vector information match; if the received feature vector and the retrieved feature vector information match, determining that the current location of the vehicle is at a segment location of the segment associated with the retrieved feature vector information; after determining the segment location, determining a new feature vector in view of the sensor; characterizing the new feature vector; and providing the new feature vector to another vehicle to aid the other vehicle in determining the location at the segment.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized.

The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. An alerting component for an autonomous system, comprising:
   a user sensor configured to sense a cognition-indicating attribute of a user utilizing the autonomous system and the user sensor is further configured to output a user sensor signal in accord with the sensed cognition-indicating attribute;
   a system state input configured to receive a system state indicating whether the autonomous system requires the attention of the user;
   a processor, comprising a memory for storing instructions for execution by the processor, and receiving the user sensor signal and the system state sensor; and
   the processor, upon determining that each of the system state indicates the autonomous system is in a state that requires an action from the user and the user sensor signal indicates the user is presently inattentive, executes an alerting protocol; and
   wherein the processor, as an output of the execution of the alerting protocol, signals the autonomous system to perform an alerting action; and
   wherein the processor, having at least initiated execution of the alerting protocol, fails to receive an acknowledgement input to a device configured to receive an input from the user, provides a subsequent alerting signal to the autonomous system to perform an alerting action.

2. The alerting component for the autonomous system of claim 1, wherein the cognition-indicating attribute comprises a signal of a state of a component of the autonomous system.

3. The alerting component for the autonomous system of claim 1, wherein the component of the autonomous system is operable to indicate a usage by the user determinative, at least in part, of attentiveness.

4. The alerting component for the autonomous system of claim 1, wherein the processor signals the autonomous system to perform an alerting action, further comprising signaling an output component of the autonomous system to perform the alerting action.

5. The alerting component for an autonomous system of claim 1, wherein the processor signals the autonomous system to perform an alerting action, further comprising signaling a configuration component of the autonomous system to perform the alerting action comprising a reconfiguration of the configuration component.

6. The alerting component for the autonomous system of claim 1, wherein the processor, having at least initiated execution of the alerting protocol, receives either an updated value from the system state input indicating the system state does not require the action from the user or the user sensor signal indicating the user is not presently inattentive, terminates the alerting protocol.

7. The alerting component for the autonomous system of claim 6, wherein the processor determines the system state indicates the autonomous system is not in the state that requires the action from the user, when the system state indicates the autonomous system is currently being operated by the user or not in an autonomous mode.

8. The alerting component for the autonomous system of claim 1, wherein the processor executes the alerting protocol modified by configuration preferences and provides signals the autonomous system to perform an alerting action in accord with the configuration preferences.

9. The alerting component of the autonomous system of claim 1, wherein the alerting component comprises a portion of the autonomous system and the autonomous system is vehicle for conveying the user.

10. A method for alerting a user utilizing an autonomous system, comprising:
sensing a cognition-indicating attribute of the user;
sensing an attention requiring attribute of the autonomous system;
upon determining that each of cognitive-indicating attribute of the user indicates inattentiveness and attention requiring attribute of the autonomous system indicates the autonomous system is in a state that requires an action from the user,
executing an alerting protocol comprising outputting signals to the autonomous system to cause the autonomous system to perform an alerting action; and
upon having at least initiated execution of the alerting protocol, and failing to receive an acknowledgement input to a device configured to receive an input from the user, providing a subsequent alerting signal to the autonomous system to perform an alerting action.

11. The method of claim 10, wherein the cognition-indicating attribute comprises a signal of a state of the component of the autonomous system.

12. The method of claim 10, wherein outputting signals to the autonomous system to cause the autonomous system to perform the alerting action, further comprises outputting signals to the autonomous system to cause a component of the autonomous system to perform the alerting action.

13. The method of claim 10, wherein the alerting action, further comprises an alerting action signaling a configuration component of the autonomous system to perform the alerting action comprising a reconfiguration of the configuration component.

14. The method of claim 10, further comprising, having at least initiated execution of the alerting protocol, receiving either an updated value from the system state input indicating the system state does not require the action from the user or the user sensor signal indicating the user is not presently inattentive, and in response thereto, terminating the alerting protocol.

15. The method of claim 10, wherein receiving the updated value from the system state indicating the autonomous system is not in the state that requires the action from the user, comprising the system state indicates the autonomous system is currently being operated by the user or not in an autonomous mode.

16. The method of claim 10, wherein the alerting protocol is determined, at least in part, in accord with configured preferences.

17. The method of claim 10, wherein the alerting component comprises a portion of the autonomous system and the autonomous system is vehicle for conveying the user.

18. An autonomous vehicle, comprising:
a processor configured to operate the vehicle in an autonomous mode and a non-autonomous mode, comprising providing all control inputs to vehicle control components and operate the vehicle in a non-autonomous mode wherein a user input to a user input component provides at least one of the all control inputs to at least one of the vehicle control components;
a user sensor configured to sense a cognition-indicating attribute of the user utilizing the vehicle and, in response thereto, output a user sensor signal to the processor;
the processor, comprising a memory for storing instructions for execution by the processor, and receiving the user sensor signal; and
the processor, upon determining that the vehicle is in the autonomous mode and the user sensor signal indicates the user is presently inattentive, executes an alerting protocol; and
wherein the processor, as an output of the execution of the alerting protocol, signals the vehicle to perform an alerting action; and
wherein the processor, having at least initiated execution of the alerting protocol, fails to receive an acknowledgement input to a device configured to receive an input from the user, provides a subsequent alerting signal to the autonomous system to perform an alerting action.

19. The autonomous vehicle of claim 18, wherein:
the user sensor further comprises a configuration sensor to output the sensor signal indicating a configuration of a user-configured component of the vehicle; and
the processor, upon determining the sensor signal indicates the user-configured component of the vehicle is configured in a manner that hinders the user from being attentive, further determining the user sensor indicates the user is presently inattentive.

\* \* \* \* \*

UNITED STATES PATENT AND TRADEMARK OFFICE
CERTIFICATE OF CORRECTION

PATENT NO. : 10,576,994 B1
APPLICATION NO. : 16/108327
DATED : March 3, 2020
INVENTOR(S) : James S. Higgins et al.

Page 1 of 1

It is certified that error appears in the above-identified patent and that said Letters Patent is hereby corrected as shown below:

In the Claims

Claim 1, Column 40, Line 16, delete "accord" and insert --accordance-- therein.
Claim 1, Column 40, Line 27, after "indicates" insert --that-- therein.
Claim 1, Column 40, Line 35, insert --and-- before "provides" therein.
Claim 10, Column 41, Line 18, after "inattentiveness" insert --of the user-- therein.
Claim 10, Column 41, Line 19, after "indicates" insert --that-- therein.
Claim 18, Column 42, Line 17, after "and" insert --to-- therein.
Claim 18, Column 42, Line 28, after "indicates" insert --that-- therein.
Claim 18, Column 42, Line 37, insert --and-- before "provides" therein.

Signed and Sealed this
Twenty-eighth Day of April, 2020

Andrei Iancu
*Director of the United States Patent and Trademark Office*